United States Patent

Liedek et al.

[11] Patent Number: 4,830,775
[45] Date of Patent: May 16, 1989

[54] ZINC AND/OR LEAD SALTS OF CARBOXYLIC ACIDS AND THEIR USE AS CORROSION INHIBITORS

[75] Inventors: Egon Liedek, Esslingen; Gerhard Haegele, Stuttgart, both of Fed. Rep. of Germany

[73] Assignee: BASF Lacke ± Farben Aktiengesellschaft, Muenster, Fed. Rep. of Germany

[21] Appl. No.: 48,744

[22] Filed: May 11, 1987

[30] Foreign Application Priority Data

May 17, 1986 [DE] Fed. Rep. of Germany ....... 3616721

[51] Int. Cl.$^4$ .............................................. C09K 15/04
[52] U.S. Cl. ............................. 252/389.52; 106/15.05; 252/389.51; 252/392
[58] Field of Search ............... 252/389.51, 389.52, 252/392; 106/15.05

[56] References Cited

U.S. PATENT DOCUMENTS

| | | | |
|---|---|---|---|
| 3,591,555 | 7/1971 | Rabiloud et al. | 260/47 |
| 4,089,690 | 5/1978 | Pantzer et al. | 252/387 |
| 4,329,381 | 5/1982 | Eschwey et al. | 252/391 |
| 4,344,862 | 8/1982 | Widder et al. | 252/391 |
| 4,647,452 | 3/1987 | Ritchey et al. | 424/54 |

Primary Examiner—Paul Lieberman
Assistant Examiner—Willie J. Thompson
Attorney, Agent, or Firm—Oblon, Fisher, Spivak, McClelland & Maier

[57] ABSTRACT

Novel zinc, lead or zinc/lead salts of carboxylic acids of the formula

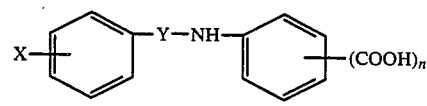

where Y is —CO— or —SO$_2$—, X is H or —NO$_2$ and n is 1 or 2.

The salts, in particular the basic salts of (I), are useful corrosion-inhibitors for coating systems, especially for aqueous or water-dilutable systems.

11 Claims, No Drawings

ZINC AND/OR LEAD SALTS OF CARBOXYLIC ACIDS AND THEIR USE AS CORROSION INHIBITORS

A large number of products have been proposed for replacing red lead and pigments based on zinc chromate as corrosion inhibitors. These substitutes contain predominantly metal-containing organic compounds.

For example, German Pat. No. 2,502,781 describes zinc and lead salts based on 5-nitroisophthalic acid, and mixtures of these salts, as antirust additives for coatings. Among the salts described in this patent, the zinc salt of 5-nitroisophthalic acid in particular is used industrially. However, a disadvantage of the products described in German Pat. No. 2,502,781 is that their action and range of application are limited. For example, one complaint is that an adequate effect is not achieved in aqueous coating systems.

Similar behavior is shown by the zinc and lead salts which are described in German Laid-Open Applications DOS Nos. 2,807,698 and 2,824,508.

To deal with the constantly changing and complex problems of rust inhibition with the aid of coatings, it is desirable to provide further active substances whose properties are improved in different respects. A range of further active substances which can be regarded as equivalent alternatives to the prior art will be sufficient to constitute technical progress, since frequently advantages can only be recognized after extensive experience in specific technical applications.

It is an object of the present invention to provide further pigments which are suitable for inhibiting corrosion and do not have the disadvantages of the known corrosion-inhibiting pigments.

The present invention relates to zinc, lead or zinc/lead salts of carboxylic acids of the formula

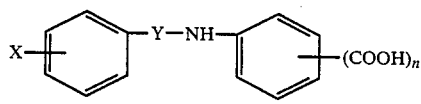 (I)

where Y is —CO— —SO$_2$—, X is hydrogen or nitro and n is 1 or 2.

Compared with the most similar zinc and lead salts disclosed in German Pat. No. 2,502,781, the novel salts of the invention have better corrosion-inhibiting properties, for example in air-drying linseed oil/wood oil alkyd resins. Moreover, the salts according to the present invention are also suitable for aqueous coating systems, for example for water-dilutable alkyd resins.

Zinc and/or lead salts of the carboxylic acid (I) in which X is hydrogen, are preferred.

Other noteworthy salts of carboxylic acids (I) are those in which Y is —SO$_2$—.

The zinc and/or lead salts of the carboxylic acid (II)

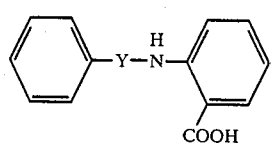 (II)

where Y is —CO— or, in particular, —SO$_2$—, are particularly preferred because of their particularly good inhibitor effect.

Basic zinc and/or lead salts of carboxylic acids (I), in particular of the carboxylic acids (II), in which the molar ratio of carboxylic acid to zinc and/or lead is 1:1, are very particularly preferred.

These basic salts are of the formula (III)

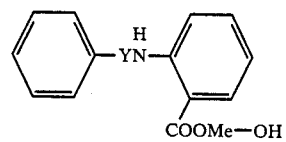 (III)

where Y is —CO— or, in particular, —SO$_2$— and Me is Zn, pb or a mixture of Zn and Pb.

The novel salts are present in the liquid coating materials in general in amounts of from 0.2 to 5, preferably from 0.5 to 2, % by weight, based on the solids.

The novel zinc, lead or zinc/lead salts are obtained in a conventional manner, either by reacting the alkali metal salts of the acids (I) or (II) with soluble zinc or lead salts or mixtures of these, eg. zinc sulfate and/or lead nitrate, or by reacting the free acids (I) or (II) with zinc oxide and/or lead oxide in an aqueous medium at elevated temperatures.

By varying the ratio of carboxylic acid (I) or (III) to zinc compounds, to lead compounds, or mixtures of these, the concentration, the temperature, the time and the pH, pure, ie. defined, zinc, lead or zinc/lead compounds of various basicities are obtained.

The neutral salts of (I) are obtained, as a rule, with a ratio of two equivalents of carboxylic acid and two equivalents (=1 mole) of zinc and/or lead compound in a neutral reaction medium. To prepare the basic salts, two equivalents (=1 mole) of zinc and/or lead oxide are used per equivalent of carboxylic acid, the resulting higher pH being sufficient to form the basic salts. If, instead of the oxides, the corresponding water-soluble salts are used, the equivalent amount of bases, ie. two equivalents per equivalent of carboxylic acid, must be added to the mixture so that formation of the basic salts takes place at alkaline pH.

Particularly suitable bases are the alkali metal hydroxides, such as sodium and potassium hydroxide, in the form of the aqueous solutions.

The aqueous reaction mixture is kept at the desired temperature until the pH of the aqueous phase remains constant. The precipitated salts of (I) are isolated in a conventional manner, washed and dried.

The resulting compound is generally determined by comparing the analytical data, the IR spectra and the X-ray diffraction patterns. As a rule, it is impossible to predict whether stable basic zinc and/or lead salts can be prepared from an organic acid.

The preparation of the salts is described in the Examples.

I. WORKING EXAMPLES

Example 1

12.06 g (0.05 mole) of 2-benzoylaminobenzoic acid are dissolved in 250 ml of water by adding 25 ml of 4N NaOH at 80° C. 14.38 g (0.05 mole=0.1 equivalent) of ZnSO$_4$.7H$_2$O in 40 ml of water are added, after which the foamy suspension containing fine needles is stirred at 80° C. until a product consisting of long needles has formed. This takes 4 hours. The pH of the suspension is 7.5. Cooling, filtration under suction and washing give 15.8 g (92.5% of theory) of a zinc salt having the composition $C_{14}H_{11}NO_4Zn$.

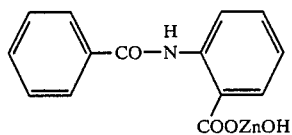

Example 2

4.07 g (0.05 mole=0.1 equivalent) of ZnO in 150 ml of water are heated at 90° C. 12.06 g (0.05 mole=0.05 equivalent) of 2-benzoylaminobenzoic acid are added, after which the resulting foamy suspension is further stirred at 90° C. until the pH has stabilized and crystal form consisting of platelets is obtained. The final pH is 7.0. 15.6 g (95% of theory) of a zinc salt are obtained, this salt having the same chemical composition as that obtained in Example 1, but a different IR spectrum.

Example 3

12.06 g (0.05 mole) of 2-benzoylaminobenzoic acid in 250 ml of water are heated at 50° C. and dissolved with 12.5 ml of 4N NaOH (0.05 mole). 7.19 g (0.025 mole=0.05 equivalent) of $ZnSO_4.7H_2O$ in 40 ml of water are added, after which stirring is continued at 50° C. until the pH remains constant. The resulting pH is 7.3. The acicular precipitate is filtered off under suction and washed to give 13.4 g (95.3% of theory) of a zinc salt which has the composition $C_{28}H_{20}N_2O_6Zn$ and whose IR spectrum differs from that of the salts obtained according to Examples 1 and 2.

Example 4

2.03 g (0.025 mole=0.05 equivalent) of ZnO are added to 13.87 g (0.05 mole=0.05 equivalent) of 2-phenylsulfonylaminobenzoic acid in 150 ml of water, and the stirred suspension is heated at 80° C. The resulting pH is 6.2. Working up the tabular precipitate gives 13.6 g of a zinc salt whose analytical data correspond to a neutral zinc di-(2-phenylsulfonylaminobenzoate).

Example 5

13.87 g (0.05 mole) of 2-(phenylsulfonylaminobenzoic acid are dissolved in 150 ml of water at room temperature with 25 of 4N NaOH (0.1 mole), 14.38 g (0.05 mole) of $ZnSO_4.7H_2O$ in 100 ml of water are added and the resulting suspension is stirred until the pH remains constant. The resulting pH is 7.4. Working up in a conventional manner gives 11.5 g of a zinc compound whose analytical data correspond to a basic zinc salt which contains 1 mole (=2 equivalents) of Zn per mole (=equivalent) of acid.

Example 6

9.64 g (0.03 mole) of 5-phenylsulfonylaminoisophthalic acid in 150 ml of water are heated at 80° C. and dissolved with 30 ml of 4N NaOH (0.12 mole). Thereafter, 17.25 g (0.06 mole) of $ZnSO_4.7H_2O$ in 60 ml of water are added and the stirred mixture is heated further until the pH remains constant. The resulting pH is 7.0. 12.8 g (81.2% of theory) of a basic product consisting of 2 moles (=4 equivalents) of Zn per mole (=2 equivalents) of dicarboxylic acid are obtained.

Example 7

13.87 g (0.05 mole) of 2-phenylsulfonylaminobenzoic acid in 130 ml of water are dissolved with 12.5 ml (0.052 mole) of 4N NaOH while heating. 8.28 g (0.025 mole=0.05 equivalent) of Pb $(NO_3)_2$ in 40 ml of water are added, after which stirring is continued at 50° C. until the pH remains constant. The resulting pH is 5.8. Working up in a conventional manner gives 18.5 g of an acicular product whose analytical data correspond to lead di-(2-phenylsulfonylaminobenzoate). (2 equivalents of Pb to 2 equivalents of carboxylic acid).

Example 8

13.87 g (0.05 mole) of 2-phenylsulfonylaminobenzoic acid were dissolved in 130 ml of water with 25 ml of 4N NaOH (0.1 mole). 16.56 g (0.05 mole) of Pb $(NO_3)_2$ in 60 ml of water are added, after which the mixture is stirred at 50° C. until the pH remains constant. The resulting pH is 6.3. 24.2 g of a product are obtained whose analytical data correspond to the basic salt of the organic acid used, which salt has a higher lead content, and whose IR spectrum differs from that of the compound obtained according to Example 7.

Example 9

The procedure described in Example 6 is followed, except that the 5-phenylsulfonylaminoisophthalic acid is replaced by the equivalent amount of 5-benzoylaminoisophthalic acid.

A basic salt is obtained in good yield.

Example 10

The procedure described in Example 1 is followed, except that, instead of 2-benzoylaminobenzoic acid, the same amount of 3-benzoylaminobenzoic acid is used.

15.7 g of the basic zinc salt are obtained.

Example 11

The procedure described in Example 1 is followed, except that 4-benzoylaminobenzoic acid is used instead of the 2-benzoylaminobenzoic acid.

15.8 g of a basic zinc salt are obtained.

II. USE AND TESTING OF THE SALTS FOR THEIR CORROSION-INHIBITING EFFECT

The salts are tested by the salt spray test according to DIN 50,021 for 200 and 400 hours. The test plates used are USt 1405 steel sheets (unbonderized). These are coated on a whirler coater so that a pigment volume concentration (PVC) of 36% and a layer thickness of 40 $\mu$m result. The coating is dried for 1 week and then for 2 hours at 50° C. Thereafter, the coatings are scored in a similar manner and then subjected to the test. The coating materials are prepared according to the formulations below.

II(a) Nonaqueous coating material 1.5 g of substance to be tested,
16.5 g of microtalc,
12 g of Millicarb
10 g of iron oxide red and
75 g of an air-drying linseed oil/wood oil alkyd resin

II(b) Aqueous coating material 1 g of substance to be tested, 20 g of Millicarb,
19 g of EWO powder,
10 g of iron oxide red,
40 g of binder (63% strength formulation of an air-drying, water-dilutable alkyd resin)
4 g of triethylamine (additive) and
6 g of solvent.

The mixtures are dispersed for 2 hours on a vibratory mill (RED DEVIL ®). The coating material is then separated from the milling balls by centrifuging.

After the test plates have been subjected to corrosion in a salt spray chamber, part of the coatings is removed by caustic treatment and the plates are evaluated.

The area exposed by caustic treatment, the underrusting at the score and degree of removal in an adhesive strip peeling test are assessed. Addition of the numerical values gives the corrosion protection value (CW), which expresses an effect-dependent percentage in relation to the fully intact coating (CW=100).

Coatings having a good antirust action possess a CW of about 50, those having CW≧70 being regarded as very good. Test plates without the addition of an inhibitor give a CW of 0.

Coating materials are prepared with the salts stated in Table 1, according to II(a). The coated sheets are tested according to DIN 50,021 and assessed after 400 hours.

TABLE 1

Summary of the results of the test to determine the corrosion-inhibiting effect.

| Salt of Example | Corrosion protection value [400 h] | Prior art (1) |
|---|---|---|
| 1 | 80 | 72 |
| 2 | 85 | 75 |
| 4 | 62 | 77 |
| 5 | 79 | 71 |
| 6 | 73 | 57 |
| 9 | 70 | 55 |
| 10 | 73 | 62 |
| 11 | 78 | 70 |

(1) Zinc 5-nitroisophthalate according to German Patent 2,502,781

Water-dilutable coating materials are prepared with the salts stated in Table 2, according to II(b). The coated sheets are tested according to DIN 50,021 and assessed after 400 hours.

TABLE 2

Summary of the results of the test to determine the corrosion-inhibiting effect.

| Salt of Example | Corrosion protection value [400 h] | Prior art (1) |
|---|---|---|
| 2 | 78 | 38 |
| 4 | 60 | 38 |

(1) Zinc 5-nitroisophthalate according to German Patent 2,502,781

We claim:

1. A zinc, lead or zinc/lead salt of a carboxylic acid of the formula

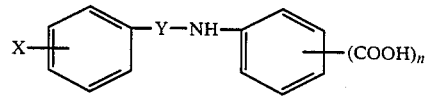

where Y is —CO— or —SO$_2$—, X is hydrogen or nitro and n is 1 or 2.

2. A zinc, lead or zinc/lead salt as claimed in claim 1, wherein X is hydrogen.

3. A zinc, lead or zinc/lead salt as claimed in claim 1, wherein Y is —SO$_2$—.

4. A zinc, lead or zinc/lead salt as claimed in claim 2, wherein Y is —SO$_2$—.

5. A zinc, lead or zinc/lead salt of the carboxylic acid of the formula

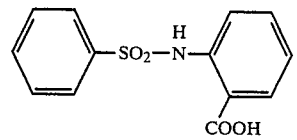

6. A zinc, lead or zinc/lead salt as claimed in claim 1, wherein the molar ratio of the carboxylic acid to the zinc, to the lead and to the zinc and lead is 1:1.

7. A zinc, lead or zinc/lead salt as claimed in claim 2, wherein the molar ratio of the carboxylic acid to the zinc, to the lead and to the zinc and lead is 1:1.

8. A zinc, lead or zinc/lead salt as claimed in claim 3, wherein the molar ratio of the carboxylic acid to the zinc, to the lead and to the zinc and lead is 1:1.

9. A zinc, lead or zinc/lead salt as claimed in claim 4, wherein the molar ratio of the carboxylic acid to the zinc, to the lead and to the zinc and lead is 1:1.

10. A zinc, lead or zinc/lead salt as claimed in claim 5, wherein the molar ratio of the carboxylic acid to the zinc, to the lead and to the zinc and lead is 1:1.

11. A zinc or lead salt of the formula

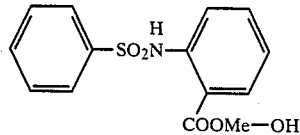

where Me is Zn or Pb.

* * * * *